United States Patent
Yu et al.

(10) Patent No.: US 7,869,485 B2
(45) Date of Patent: Jan. 11, 2011

(54) METHOD AND APPARATUS FOR DETECTING LOCK STATUS OF A GPS SIGNAL

(75) Inventors: Xiaoguang Yu, Wuhan (CN); Jianhui Hou, Sichuan (CN); Bo Yu, Sichuan (CN); Haiquan Huang, Sichwan (CN)

(73) Assignee: O2Micro International Ltd., Georgetown (KY)

( * ) Notice: Subject to any disclaimer, the term of this patent is extended or adjusted under 35 U.S.C. 154(b) by 819 days.

(21) Appl. No.: 11/820,807

(22) Filed: Jun. 21, 2007

(65) Prior Publication Data

US 2008/0317101 A1 Dec. 25, 2008

(51) Int. Cl.
*H04B 1/00* (2006.01)

(52) U.S. Cl. .................. 375/147; 375/130; 375/148; 375/150; 375/149; 375/326

(58) Field of Classification Search .............. 375/147, 375/148, 150
See application file for complete search history.

(56) References Cited

U.S. PATENT DOCUMENTS

| | | | | |
|---|---|---|---|---|
| 4,785,463 A | * | 11/1988 | Janc et al. | 375/147 |
| 5,223,843 A | * | 6/1993 | Hutchinson | 342/352 |
| 5,963,582 A | * | 10/1999 | Stansell, Jr. | 375/148 |
| 6,272,189 B1 | * | 8/2001 | Garin et al. | 375/343 |
| 7,395,155 B2 | * | 7/2008 | Hsu | 701/213 |
| 2002/0015439 A1 | * | 2/2002 | Kohli et al. | 375/148 |
| 2004/0141549 A1 | * | 7/2004 | Abraham et al. | 375/150 |
| 2006/0022868 A1 | * | 2/2006 | Awata | 342/357.12 |
| 2007/0076788 A1 | * | 4/2007 | Jia et al. | 375/150 |
| 2007/0153880 A1 | * | 7/2007 | Cartmell | 375/149 |
| 2007/0201539 A1 | * | 8/2007 | Yu et al. | 375/148 |

FOREIGN PATENT DOCUMENTS

| EP | 2007020 A2 * | 12/2008 |
|---|---|---|
| JP | 2009005327 A * | 1/2009 |

* cited by examiner

*Primary Examiner*—Shuwang Liu
*Assistant Examiner*—Kenneth Lam
(74) *Attorney, Agent, or Firm*—Wang Law Firm; Li K. Wang

(57) ABSTRACT

An apparatus for detecting lock status of a spread spectrum signal, having a first accumulator, a first calculation unit, a second calculation unit, a second accumulator, a multiplier and a comparator. The first accumulator accumulates an in-phase integration result and a quadrature integration result over a time period. The first calculation unit determines a first evaluation value based on the accumulated in-phase integration result and the accumulated quadrature integration result. The second calculation unit processes the in-phase integration result and the quadrature integration result. The second accumulator accumulates the output of the second calculation unit over the time period. The multiplier determines a second evaluation value by multiplying the accumulated result from the second accumulator with a predetermined value. The comparator compares the first and second evaluation results wherein the comparison result is an indicator of the lock status.

29 Claims, 3 Drawing Sheets

METHOD AND APPARATUS FOR DETECTING LOCK STATUS OF A GPS SIGNAL

FIELD OF THE INVENTION

The invention relates to spread spectrum signal processing, and more particularly, to detecting a lock status of a GPS signal.

BACKGROUND OF THE INVENTION

Generally, a GPS receiver must first acquire GPS signals from a plurality of satellites and then track these signals. During the acquisition stage, the carrier frequency and initial phase of the pseudorandom noise code (PRN code) of a received signal are found. These two parameters are then used for tracking the signal.

Due to the motion of the satellites and the receiver, Doppler effect may occur and the carrier frequency and PRN code may vary over time. To overcome Doppler effect and maintain the availability of GPS signals, a tracking process needs to be performed based on the initial carrier frequency and initial PRN code which are acquired during the acquisition stage. When the variations of carrier frequency and PRN code are successfully tracked by the receiver, the GPS signal is referred to as "locked" by the receiver. When the receiver fails to track the variation, a GPS signal from certain satellite is referred to as "lost". When a signal is lost, it can not be used by the receiver for further processing such as calculating the position of the receiver. The receiver may need to perform acquisition again to ensure there is enough number of signals acquired and locked for further processing.

Therefore, there is a need to detect if a GPS signal is locked or lost. When the receiver finds a signal lost, it may need to acquire the signal again or may need to acquire another signal from another satellite. The time used to detect the lock status of the signal is a critical parameter in positioning technology. The shorter the time is needed, the better the receiver performs.

Conventionally, in a GPS receiver, a bit synchronization method is employed to determine if the signal is locked or lost. More specifically, a bit synchronization module is needed to identify the bit boundaries of navigation data stream after the carrier signal and PRN code have been stripped off from the received GPS signal. The navigation data stream is formed by a sequence of navigation data bits. The lasting time of each data bit is 20 ms. The end of a data bit, which is also the beginning of another data bit, is referred to as a boundary of a navigation data bit (bit boundary). In the bit synchronization method, the lock status of the signal is detected at the same time when the bit boundaries of navigation data stream are determined. If the bit boundaries can not be determined after repeating the search process for a predetermined times, the signal is regarded as lost. The basic idea of this method is to check whether the data transitions always happen in the same position.

However, there are some drawbacks to this method. First, it is difficult to determine the bit boundaries and the lock status if there are no data transitions within a long bit sequence. In other words, this method is not efficient when there are long sequences of "0" or "1" in the navigation data stream. Second, it is time-consuming. It needs 800 ms to search 40 bits, and totally 4 seconds to confirm the result if the search process needs to be repeated 5 times. Third, the bit synchronization process needs to be performed from time to time in order to detect lock status even after the signal is acquired.

Therefore, it is to a spread spectrum receiver that is able to detect the lock status of a received signal quickly and efficiently, even if there are long sequences of "0" or "1" in the navigation data stream that the present invention is primarily directed.

SUMMARY OF THE INVENTION

The present invention provides a method for detecting the lock status of a GPS signal at the receiver. Advantageously, the status can be detected efficiently even if there are long sequences of "0" or "1" in the navigation data stream.

In one embodiment of the invention, there is provided a method for detecting the lock status of a spread spectrum signal. The method includes producing a first and second data stream by multiplying the spread spectrum signal with an in-phase carrier signal and a quadrature carrier signal, calculating a first integration result based on the first data stream and a predetermined PRN code, calculating a second integration result based on the second data stream and the PRN code, determining a first and second evaluation values in a lock status detector based on the first and second integration results, determining a ratio by dividing the first evaluation value by the second evaluation value, and determining a lock status result in the lock status detector by comparing the ratio with a predetermined value. The method may further include determining the lock status based on multiple lock status results over a time period with a state machine.

In another embodiment of the invention there is provided an apparatus for detecting lock status of a spread spectrum signal. The apparatus includes a first accumulator, a first calculation unit, a second calculation unit, a second accumulator, a multiplier, a comparator, and a state machine. The first accumulator accumulates an in-phase integration result and a quadrature integration result over a time period respectively. The first calculation unit is coupled to the first accumulator and is capable of determining a first evaluation value based on the accumulated in-phase integration result and the accumulated quadrature integration result. The second calculation unit processes the in-phase integration result and the quadrature integration result. The second accumulator is coupled to the second calculation unit and accumulates the output of the second calculation unit over the time period. At the multiplier, the accumulated result from the second accumulator is multiplied with a predetermined value to determine a second evaluation value. The comparator is coupled to the first calculation unit and the multiplier for comparing the first and second evaluation results. The state machine monitors the output of the comparator and makes a determination indicating whether the signal is locked or lost.

In yet another embodiment of the invention there is also provided a system for processing a spread spectrum signal. The system includes an acquisition module and a tracking module. The acquisition module provides the tracking module with an initial carrier frequency and a PRN code. The tracking module tracks the spread spectrum signal. The tracking module includes a first integration unit which is capable of producing an in-phase integration result, a second integration unit which is capable of producing a quadrature integration result, a bit synchronization module for detecting boundaries of navigation data bits, a lock status detector coupled to the first and second integration unit, for detecting lock status of the spread spectrum signal.

BRIEF DESCRIPTION OF THE DRAWINGS

Features and advantages of embodiments of the invention will become apparent as the following Detailed Description

DETAILED DESCRIPTION OF THE INVENTION

Figure 1:
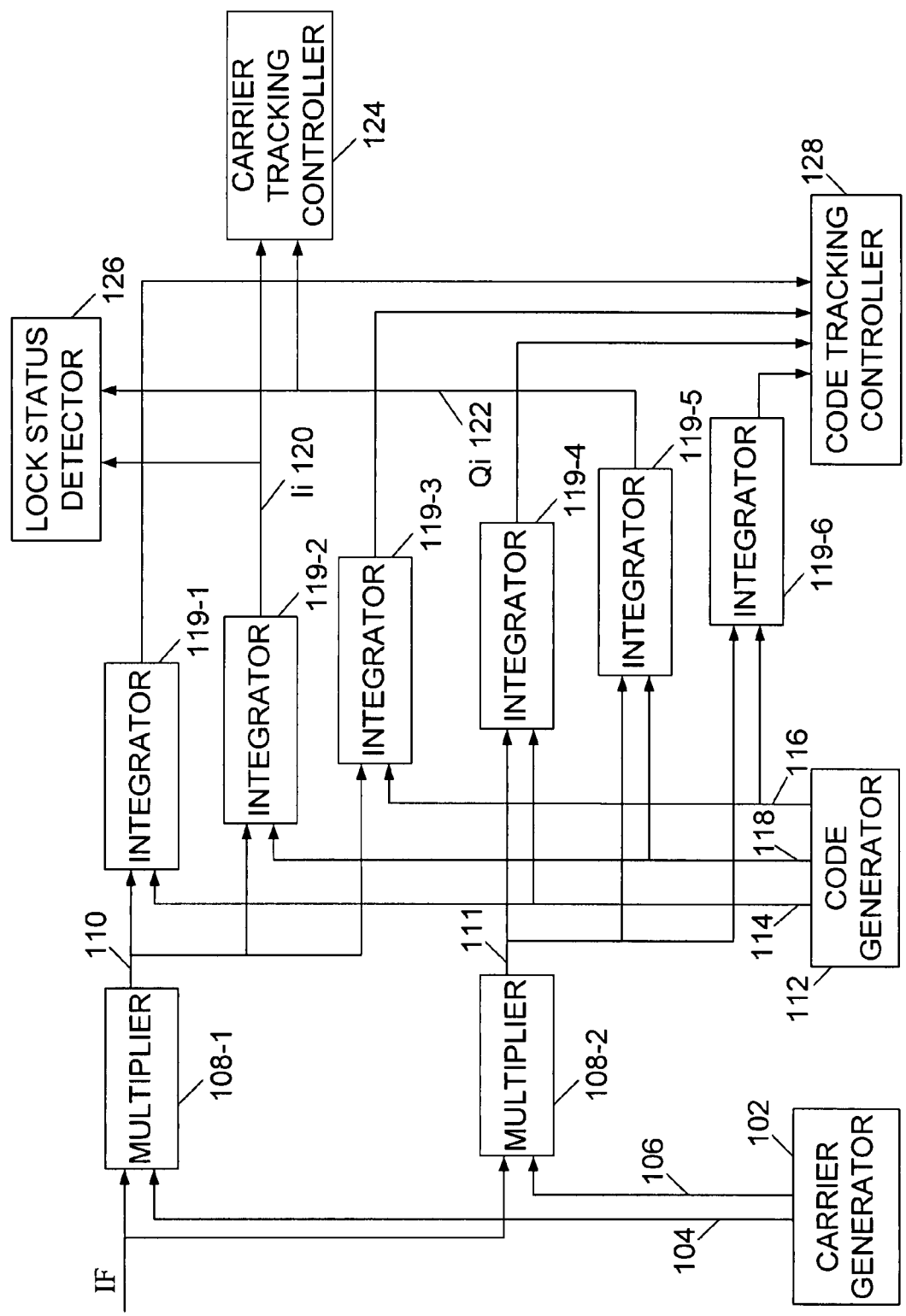
FIG. 1 illustrates an exemplary architecture of a GPS tracking module with a lock status detector.

FIG. 1 illustrates an exemplary architecture of a tracking module in a GPS receiver with a lock status detector for processing an intermediate frequency (IF) signal. The received GPS signal is first converted to a signal with a desired output frequency and then digitized at a predetermined sampling rate. The converted and digitized signal is known as an IF signal.

A carrier generator 102 generates two orthogonal carrier signals including an in-phase carrier signal 104 and a quadrature carrier signal 106. The IF signal is multiplied with these two orthogonal carrier signals at multiplier 108-1 and multiplier 108-2 to generate a first data stream 110 and a second data stream 111. A code generator 112 generates three PRN codes: an early code 114, a late code 116, and a prompt code 118. The early code and the late code are both derived from the prompt code time-shifted by approximately one-half-chip more or less. The early code, late code, and prompt code are integrated with the first data stream and the second data stream respectively in a set of integrators, which are numbered consecutively form integrator 119-1 to integrator 119-6, to generate six integration results. Integration herein refers to an operation of multiplying one of the data stream with one of the PRN code point by point and sum up the products over a time period. In a preferred embodiment, the time period of integration is 1 ms, which is the period of a PRN code. The in-phase integration result based on the prompt code and the first data stream is referred to as a first integration result Ii 120. The quadrature integration result based on the prompt code and the second data stream is referred to as a second integration result Qi 122. Ii and Qi are applied to a carrier tracking controller 124 which controls the carrier generator to generate the two orthogonal carrier signals. Ii and Qi are also applied to a lock status detector 126 to detect the lock status of the signal. The rest four integration results are applied to a code tracking controller 128 which controls the code generator to generate the early, late and prompt codes.

Figure 2:
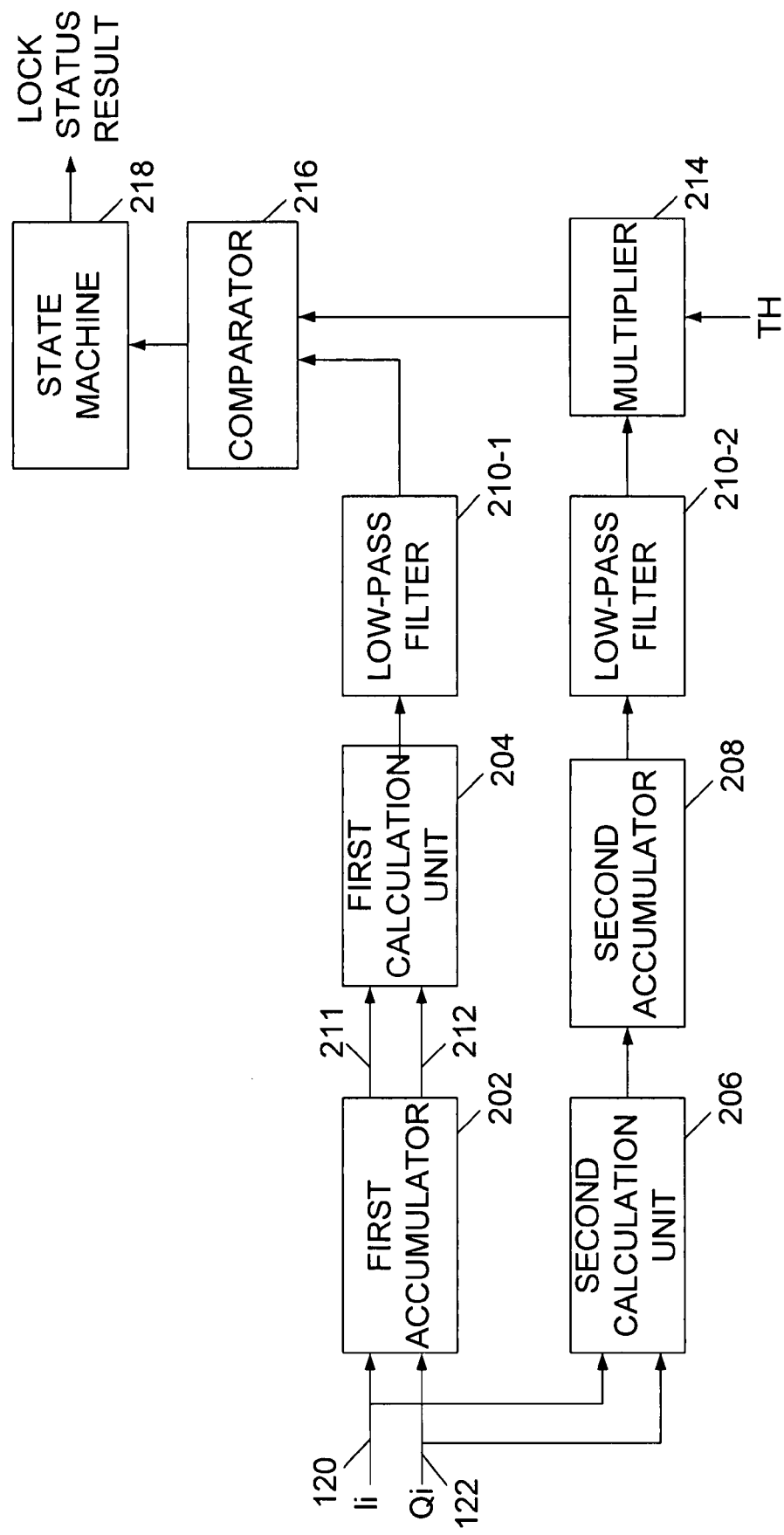
FIG. 2 illustrates an exemplary architecture of the lock status detector.

FIG. 2 illustrates architecture of the lock status detector 126 shown in FIG. 1. The lock status detector includes a first accumulator 202, a first calculation unit 204, a second calculation unit 206, a second accumulator 208, low-pass filter (LPF) 210-1, LPF 210-2, a multiplier 214, a comparator 216 and a state machine 218. Ii and Qi are divided into two paths: an S channel including the first accumulator 202, the first calculation unit 204 and LPF 210-1, and an N channel including the second calculation unit 206, the second accumulator 208 and LPF 210-2.

In the S channel, Ii and Qi are applied to the first accumulator 202 where Ii and Qi are accumulated over a time period to produce a first accumulated result Is 211 and a second accumulated result Qs 212, respectively. In a preferred embodiment, each Is is generated by summing up all the Ii which are generated from a navigation data bit and each Qs is generated by summing up all the Qi which are generated from the same navigation data bit. If each Ii and each Qi are the integration results of 1 ms, then, Is and Qs are the accumulated results of 20 Ii and 20 Qi because the period of a navigation data bit is 20 ms. A bit synchronization module (not shown in this figure) is employed to determine the boundaries of the navigation data bits to ensure that Is and Qs can be generated from a complete navigation data bit. According to the present invention, the lock status detector, rather than the bit synchronization module, detects whether a signal is locked or lost. Advantageously, bit synchronization only needs to be performed once after acquisition of the signal compared with the conventional way using bit synchronization module to detect the lock status of the GPS signal from time to time. After a pair of Is and Qs is generated by the first accumulator 202, a first calculation unit 204 determines a first evaluation value SL based on Is and Qs.

In the N channel, Ii and Qi are processed in a second calculation unit 206. The processed results are then accumulated in a second accumulator 208 by summing up multiple processed results in a predetermined time period. The predetermined time period can be multiple of 1 ms. In a preferred embodiment, the predetermined time period is 20 ms which is consistent with the time used to produce Is and Qs in the S channel. The output of the second accumulator 208 is a second evaluation value NL.

There are various available embodiments of processing Is and Qs in the first calculation unit 204 and processing Ii and Qi in the second calculation unit 206. Three preferred embodiments are provided herein. In a first embodiment of the invention, in the S channel, the first calculation unit 204 calculates the sum of squares of Is and Qs. In the N channel the second calculation unit 206 calculates the sum of squares of Ii and Qi. The first embodiment can be expressed as the following equation, where $$\sum_{i=1}^{M} I_i$$

is referred to as Is and $$\sum_{i=1}^{M} Q_i$$

is referred to as Qs.

$$\begin{cases} SL = \left(\sum_{i=1}^{M} I_i\right)^2 + \left(\sum_{i=1}^{M} Q_i\right)^2 \\ NL = \sum_{i=1}^{M} (I_i^2 + Q_i^2). \end{cases} \quad (1)$$

In a second embodiment, in the S channel, the first calculation unit 204 calculates the sum of squares of Is and Qs and then calculates the square root of the sum of squares. In the N channel, the second calculation unit 206 calculates the sum of squares of Ii and Qi and then calculates the square root of the sum of squares. The second embodiment can be expressed as the following equation.

$$SL = \sqrt{\left(\sum_{i=1}^{M} I_i\right)^2 + \left(\sum_{i=1}^{M} Q_i\right)^2} \quad (2)$$
$$NL = \sum_{i=1}^{M} \left(\sqrt{I_i^2 + Q_i^2}\right)$$

In a third embodiment, in the S channel, the first calculation unit 204 calculates the sum of absolute values of Is and Qs. In the N channel, the second calculation unit 206 calculates the sum of absolute values of Ii and Qi. The third method is expressed as the following equation.

$$SL = \left|\sum_{i=1}^{M} I_i\right| + \left|\sum_{i=1}^{M} Q_i\right| \quad (3)$$
$$NL = \sum_{i=1}^{M} (|I_i| + |Q_i|)$$

The first evaluation value SL and second evaluation value NL are passed through LPF 210-1 and LPF 210-2 respectively to obtain smoother filtered results. The LPF can be a first order infinite impulse response filter (IIR filter). The filtered result of the first evaluation value SL is referred to as A and the filtered result of the second evaluation value NL is referred to as C. The ratio of A to C is compared with a threshold value TH to generate a lock status result. For easy implementation, in a preferred embodiment, C is first multiplied with TH at multiplier 214 to obtain a product which is referred to as B, and then A is compared with B at comparator 216 to generate a comparison result, which is an indicator of the lock status. If A is greater than B, it is suggested that the signal may be locked. If B is greater than A, it is suggested that the signal may be lost. To determine the lock status more accurately, the state machine 218 is provided to make a determination based on multiple pairs of A and B.

Figure 3:
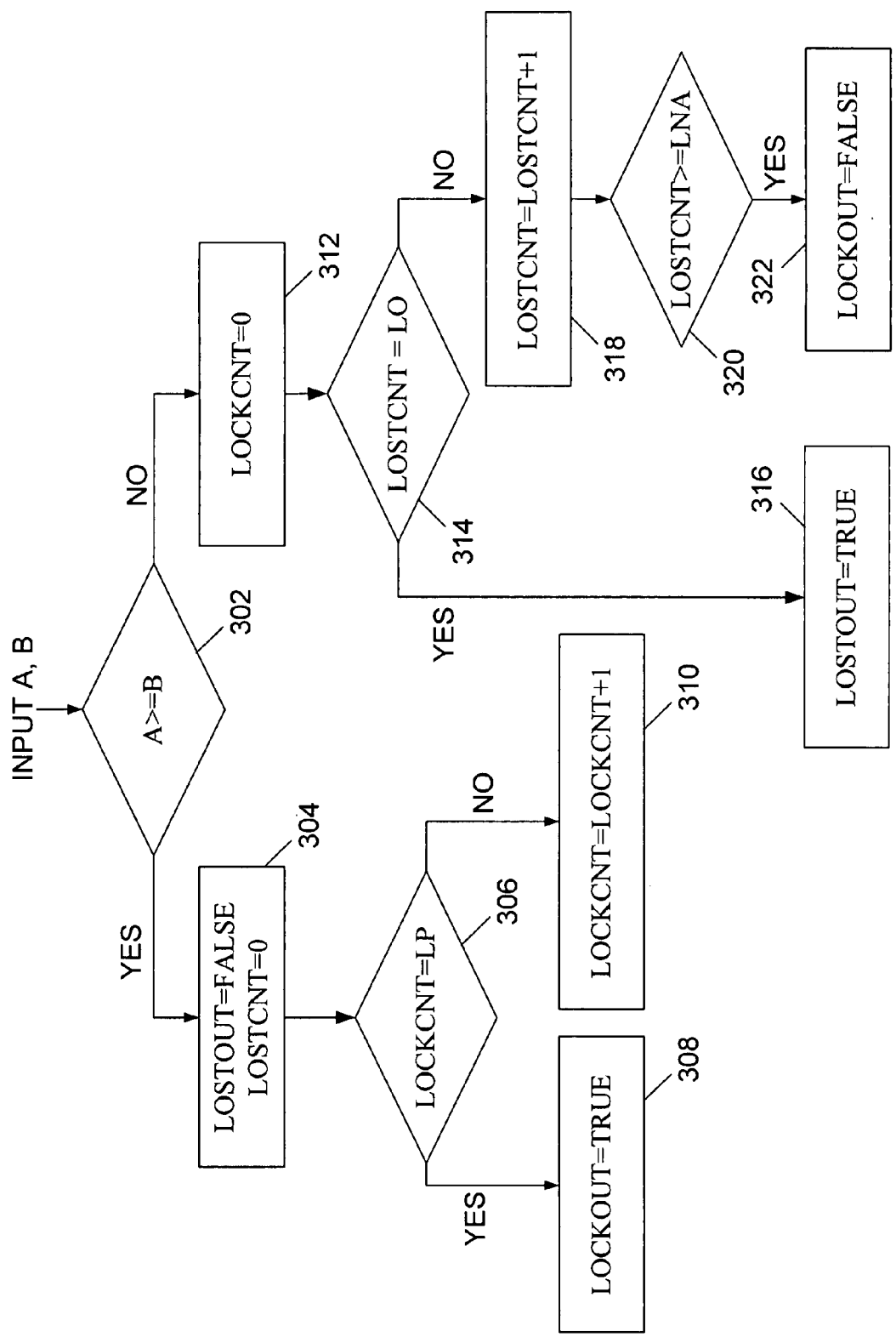
FIG. 3 illustrates a flow chart of a preferred embodiment of a state machine used to improve the performance of the lock status detector.

FIG. 3 illustrates a flow chart of a preferred embodiment of the state machine 218 used to make the determination if the signal is locked or lost based on multiple pairs of A and B. There are some parameters of the state machine including LOCKCNT, LOSTCNT, LP, LNA, and LO. The outputs of the state machine include a LOCKOUT signal and a LOSTOUT signal. LOCKOUT and LOSTOUT always have values of either "TRUE" or "FALSE". When the state machine begins to operate, both LOCKOUT and LOSTOUT are initially set to "FALSE"; both LOCKCNT and LOSTCNT are initially set to 0. Each one of LP, LNA and LO is set to a predetermined integer respectively. LO is always greater than LNA. LP, LNA and LO are determined by system requirement such as detection probability, false alarm probability and the time needed to generate a lock status result.

The state machine receives a pair of A and B and makes a comparison, step 302. If A is greater than B or if A is equal with B, LOSTOUT is set to FALSE and LOSTCNT is set to 0, step 304. Then, the state machine checks the value of LOCKCNT, step 306. If LOCKCNT is equal with LP, LOCKOUT is set to TRUE, step 308; else LOCKCNT is increased by 1, step 310.

If A is smaller than B, then LOCKCNT is set to 0, step 312. Then the state machine checks the value of LOSTCNT, step 314. If LOSTCNT is equal with LO, then LOSTOUT is set to TRUE, step 316, else LOSTCNT is increased by 1, step 318. Then the value of LOSTCNT is compared with LNA, step 320. If LOSTCNT is greater than LNA or LOSTCNT is equal with LNA, then LOCKOUT is set to FALSE, step 322.

The lock status is determined by the value of LOCKOUT and LOSTOUT. If LOSTOUT is equal with FALSE and LOCKOUT is equal with TRUE, a status of "locked" is detected and the receiver will further process the information obtained from the signal.

If LOSTOUT is equal with TRUE and LOCKOUT is equal with FALSE, a status of "lost" is detected. The receiver may stop further processing the signal and may need to perform the acquisition process again.

If LOSTOUT is equal with FALSE and LOCKOUT is equal with FALSE, a status of "pre-lost" is detected. The status of "pre-lost" means the signal is not locked but may become locked through tracking process. Under this condition, the signal is held and not used for further processing, but acquisition is not performed. The state machine continues running until LOSTCNT is equal with LO to determine a status of "lost", or until LOCKCNT is equal with LP to determine a status of "locked".

In one embodiment of the invention, the state machine can be updated each time when a pair of Is and Qs is produced. To reduce the workload, in another embodiment of the invention, the state machine is updated each time when a predetermined number of Is and Qs have been produced.

By using the state machine, detection probability can be increased and false alarm probability can be decreased because the final result is based on the signal status which is obtained from a sequence of navigation data bits rather than from only one data bit. Occasional incidental or error has little effect on the final result.

It will be appreciated by those skilled in the art that apart from the state machine described above, there are different ways to design and implement the state machine, either by hardware or software.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for detecting lock status of a spread spectrum signal digitized at a predetermined frequency, comprising:
producing a first data stream by multiplying the spread spectrum signal with an in-phase signal;
producing a second data stream by multiplying the spread spectrum signal with a quadrature signal;
calculating a first integration result in an integration unit based on the first data stream and a predetermined pseudorandom noise code (PRN code), the PRN code having a same phase shift as the first data stream;
calculating a second integration result in the integration unit based on the second data stream and the predetermined PRN code, the PRN code having a same phase shift as the second data stream;
determining a first and second evaluation values in a lock status detector based on the first and second integration results;
determining a ratio by dividing the first evaluation value by the second evaluation value;

determining a lock status result in the lock status detector by comparing the ratio with a predetermined value, the lock status result indicating whether the spread spectrum signal is locked or lost;

producing multiple lock status results over a time period;

determining that the spread spectrum signal is locked when a first predetermined number of lock status results indicating the spread spectrum signal is locked have been produced consecutively; and determining that the spread spectrum signal is lost when a second predetermined number of lock status results indicating the spread spectrum signal is lost have been produced consecutively.

2. The method of claim 1, wherein determining the first evaluation value comprising:

accumulating the first and second integration results to produce a first and second accumulated results, respectively, over a time period; and calculating a sum of squares of the first and second accumulated results.

3. The method of claim 2, wherein determining the second evaluation value comprising:

calculating a sum of squares of the first and second integration results; and accumulating the sum of squares over the time period.

4. The method of claim 1, wherein determining the first evaluation value comprising:

accumulating the first and second integration results to produce a first and second accumulated results, respectively, over a time period;

calculating a sum of squares of the first and second accumulated results; and calculating a square root of the sum of squares.

5. The method of claim 4, wherein determining the second evaluation value comprising:

calculating a sum of squares of the first and second integration results;

calculating a square root of the sum of squares; and accumulating the square root over the time period.

6. The method of claim 1, wherein determining the first evaluation value comprising:

accumulating the first and second integration results to produce a first and second accumulated results, respectively, over a time period; and calculating a sum of absolute values of the first and second accumulated results.

7. The method of claim 6, wherein determining the second evaluation value comprising:

calculating a sum of absolute values of the first and second integration results; and accumulating the sum of absolute values over the time period.

8. The method of claim 1, further comprising:

filtering the first and second evaluation values in a filtering unit before determining the ratio.

9. The method of claim 1, further comprising:

detecting boundaries of navigation data bits; and accumulating the first and second integration results within the period of a navigation data bit.

10. An apparatus for detecting lock status of a spread spectrum signal digitized at a predetermined frequency, comprising:

a first accumulator for accumulating an in-phase integration result and a quadrature integration result separately, over a time period;

a first calculation unit coupled to the first accumulator for determining a first evaluation value based on the accumulated in-phase integration result and the accumulated quadrature integration result;

a second calculation unit for processing the in-phase integration result and the quadrature integration result;

a second accumulator coupled to the second calculation unit for accumulating an output of the second calculation unit over the time period;

a multiplier for determining a second evaluation value by multiplying the accumulated result from the second accumulator with a predetermined value; and a comparator coupled to the first calculation unit and the multiplier for comparing the first and second evaluation results and generating a comparison result, the comparison result being an indicator of the lock status.

11. The apparatus of claim 10, further comprising:

a state machine coupled to the comparator for determining the lock status.

12. The apparatus of claim 10, wherein the first calculation unit calculates a sum of squares of the accumulated in-phase integration result and the accumulated quadrature integration result.

13. The apparatus of claim 12, wherein the second calculation unit calculates a sum of squares of the in-phase integration result and the quadrature integration result.

14. The apparatus of claim 10, wherein the first calculation unit first calculates a sum of squares of the accumulated in-phase integration result and the accumulated quadrature integration result, and then calculates a square root of the sum of squares.

15. The apparatus of claim 14, wherein the second calculation unit first calculates a sum of squares of the in-phase integration result and the quadrature integration result, and then calculates a square root of the sum of squares.

16. The apparatus of claim 10, wherein the first calculation unit calculates a sum of absolute values of the accumulated in-phase integration result and the accumulated quadrature integration result.

17. The apparatus of claim 16, wherein the second calculation unit calculates a sum of absolute values of the in-phase integration result and the quadrature integration result.

18. The apparatus of claim 10, further comprising:

a first filter coupled between the first calculation unit and the comparator; and a second filter coupled between the multiplier and the comparator.

19. The apparatus of claim 10, wherein the time period is the period of a navigation data bit.

20. A system for processing a spread spectrum signal digitized at a predetermined sampling frequency, comprising:

an acquisition module; and a tracking module coupled to the acquisition module, comprising:

a first integration unit being capable of producing an in-phase integration result;

a second integration unit being capable of producing a quadrature integration result;

a bit synchronization module for detecting bit boundaries of navigation data bits;

a lock status detector coupled to the first and second integration unit, for detecting lock status of the spread spectrum signal, wherein the lock status detector comprising:

a first accumulator for accumulating an in-phase integration result and a quadrature integration result separately, over a time period;

a first calculation unit coupled to the first accumulator for determining a first evaluation value based on the accumulated in-phase integration result and the accumulated quadrature integration result;

a second calculation unit for processing the in-phase integration result and the quadrature integration result;

a second accumulator coupled to the second calculation unit for accumulating an output of the second calculation unit over the time period;

a multiplier for determining a second evaluation value by multiplying the accumulated result from the second accumulator with a predetermined value; and a comparator coupled to the first calculation unit and the multiplier for generating a comparison result from comparing the first and second evaluation results, the comparison result being an indicator of the lock status.

21. The system of claim 20, wherein the lock status detector further comprising:

a state machine coupled to the comparator for determining the lock status.

22. The system of claim 20, wherein the first calculation unit calculates a sum of squares of the accumulated in-phase integration result and the accumulated quadrature integration result.

23. The system of claim 22, wherein the second calculation unit calculates a sum of squares of the in-phase integration result and the quadrature integration result.

24. The system of claim 20, wherein the first calculation unit first calculates a sum of squares of the accumulated in-phase integration result and the accumulated quadrature integration result, and then calculates a square root of the sum of squares.

25. The system of claim 24, wherein the second calculation unit first calculates a sum of squares of the in-phase integration result and the quadrature integration result, and then calculates a square root of the sum of squares.

26. The system of claim 20, wherein the first calculation unit calculates a sum of absolute values of the accumulated in-phase integration result and the accumulated quadrature integration result.

27. The system of claim 26, wherein the second calculation unit calculates a sum of absolute values of the in-phase integration result and the quadrature integration result.

28. The system of claim 20, wherein the lock status detector further comprising:

a first filter coupled between the first calculation unit and the comparator; and a second filter coupled between the multiplier and the comparator.

29. The system of claim 20, wherein the time period is the period of a navigation data bit.

* * * * *